United States Patent [19]

Moriwake

[11] Patent Number: 4,994,906

[45] Date of Patent: Feb. 19, 1991

[54] DIGITAL LUMINANCE/CHROMINANCE SEPARATION APPARATUS

[75] Inventor: Katsuakira Moriwake, Kanagawa, Japan

[73] Assignee: Sony Corporation, Tokyo, Japan

[21] Appl. No.: 401,758

[22] Filed: Aug. 25, 1989

[30] Foreign Application Priority Data

Sep. 6, 1988 [JP] Japan .................................. 63-223258

[51] Int. Cl.⁵ ............................................ H04N 9/535
[52] U.S. Cl. ............................................ 358/31; 358/36
[58] Field of Search ............................... 358/31, 36, 40

[56] References Cited

U.S. PATENT DOCUMENTS 4,524,382 6/1985 Tanaka et al. ..................... 358/31
4,661,842 4/1987 Ishige et al. ...................... 358/31

FOREIGN PATENT DOCUMENTS 0139090 12/1983 Japan ................................... 358/31

Primary Examiner—James J. Groody
Assistant Examiner—David E. Harvey
Attorney, Agent, or Firm—Alvin Sinderbrand

[57] ABSTRACT

A luminance and chrominance signal separator includes a linear and a non-linear type vertical comb filters which receives a digital composite video signal having the luminance and chrominance signal. The linear and the non-linear type vertical comb filter is selectively used in response to correlation detection between successive vertical lines of the digital composite video signal so that both color smear and aliasing noise are eliminated. If necessary, a linear and a non-linear type horizontal filters are further provided wherein one is selectively used in response to a correlation detection result between successive picture elements of the digital composite video signal so that the cross-color component can be eliminated.

13 Claims, 10 Drawing Sheets

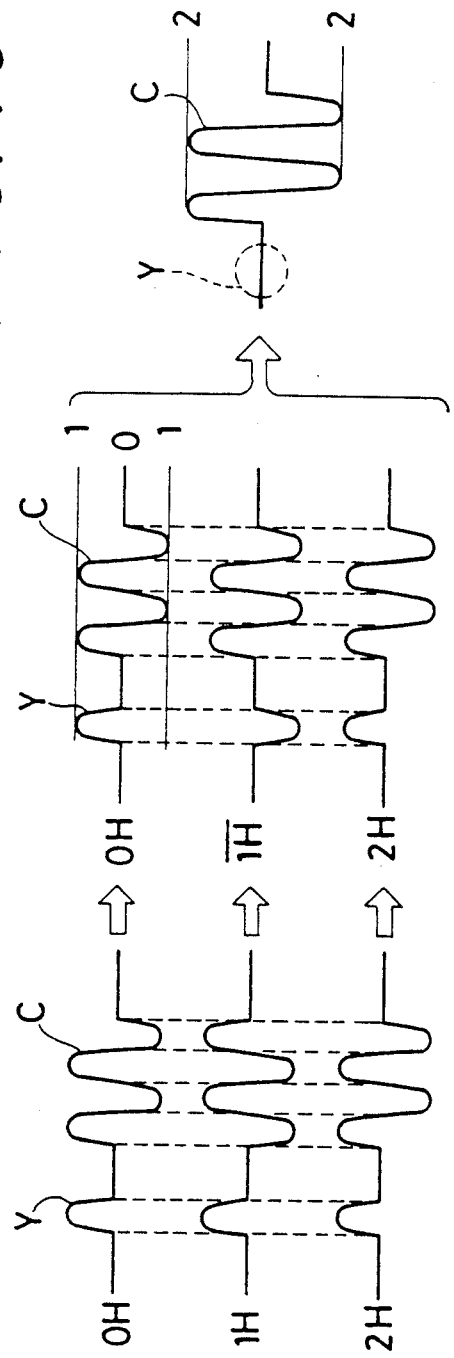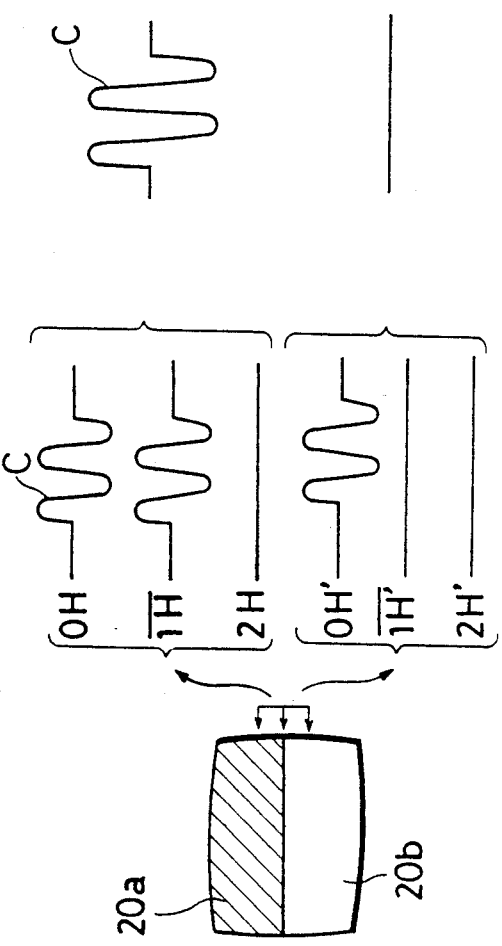

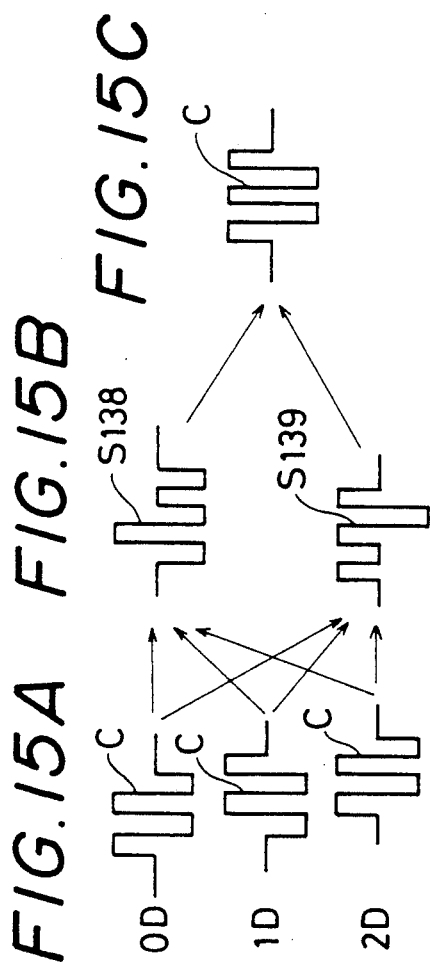
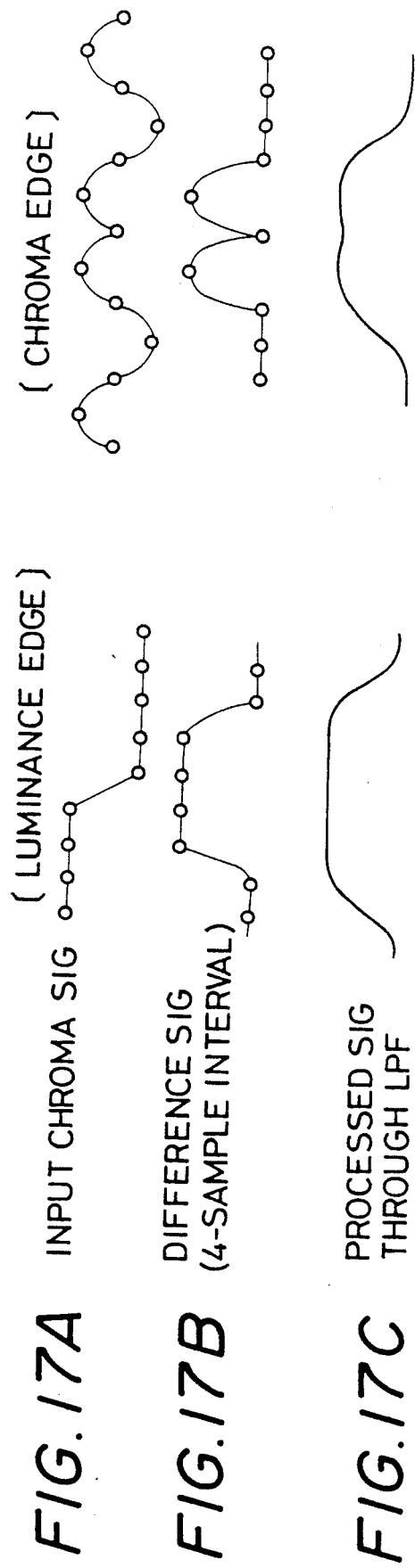

DIGITAL LUMINANCE/CHROMINANCE SEPARATION APPARATUS

BACKGROUND OF THE INVENTION

1. Field of the Invention

The present invention relates to a luminance and chrominance (Y/C) signal separator.

2. Description of the Prior Art

As is generally known, in order to separate luminance and chrominance signals from a composite video signal, a comb filter utilizing a frequency interleaved relationship between the two signals has been used. In such a comb filter, correlation is maintained in relation to a signal delayed by a horizontal scanning line period resulting in undesirable color smear appearing in the vertical direction of a screen.

There is also known a luminance and chrominance signal separator which does not produce color smear and referred to as a dynamic comb filter or a logical filter. For example, in Japanese Patent Laid-Open No. 61-23492, a technique is disclosed wherein a color video signal is supplied to a vertical correlator to separate a luminance signal therefrom, and a chrominance signal is separated by a filter and a horizontal correlator arranged to receive an output from the vertical correlator. In addition, a Y/C separator using a non-linear vertical comb filter and a horizontal correlator, which are employed in the present invention, is disclosed in Japanese Patent Laid-Open No. 64-29187. This separator includes a vertical correlator, which samples three points vertically aligned on a screen so as to determine vertical correlation between the lines containing the three points, and then separates the chrominance signal.

In general, non-linear processing is performed in a separator employing a correlator. Therefore, when digital processing using a sampling frequency three to four times a subcarrier frequency is performed, harmonic distortion due to foldover occurs in the video band.

In particular, when a zone plate test chart serving as a test pattern for allowing visual observation of two-dimensional frequency characteristics of a processing system, or a sweep test chart in which a horizontal width of an image is continuously changed in a vertical direction is displayed, interference fringes (moiré) due to foldover appear.

In order to eliminate the above interference fringes, the sampling rate may be increased so as to perform an over-sampling processing. Therefore, even if foldover noise is generated, the noise may fall outside the video band. However, this method might not be practical because it requires a large-scale digital circuit operating at a very high speed.

SUMMARY OF THE INVENTION

Accordingly, it is an object of the present invention to provide a luminance and chrominance signal separator which avoids the above-mentioned disadvantages of the prior art.

More specifically, it is an object of the present invention to provide a luminance and chrominance signal separator in which the separated signals do not contain color smear and foldover noise.

It is another object of the present invention to provide a luminance and chrominance signal separator which includes linear and non-linear horizontal filters in which the outputs therefrom are selected on the basis of the output of a horizontal correlation circuit, with the non-linear horizontal filter being selected when correlation does not exist for eliminating a cross-color component from the output of the non-linear and linear vertical comb filters, whereas, the linear horizontal filter is selected when correlation exists and reduces fold over noise.

In accordance with an aspect of the present invention, a luminance and chrominance signal separator comprises: a filter for extracting from a composite video signal a chrominance signal and a high freqency component of the luminance signal included within the frequency ban of the chrominance signal; a non-linear vertical comb filter to which three successive horizontal line signals of the chrominance signal and high frequency component of the luminance signal are supplied for generating a chrominance signal without color smear; a linear vertical comb filter which receives the three successive horizontal line signals of the chrominance signal for generating a chrominance signal without aliasing noise; a correlation detecting circuit for detecting the correlation between the three successive horizontal line signals; and a selector responsive to the output of the detection circuit for selecting the output of the non-linear vertical comb filter when there is an absence of correlation and for selecting the output of the linear vertical comb filter when correlation exists.

The above, and other objects, features and advantages of the present invention, will be apparent in the following detailed description of the preferred embodiments of the invention when read in conjunction with the accompanying drawings.

BRIEF DESCRIPTION OF THE DRAWINGS

FIGS. 4A to 4C are waveform charts for explaining an operation of the circuit in FIG. 3;

FIG. 5A shows an image sample and FIGS. 5B and 5C are waveform charts for explaining an operation of the circuit in FIG. 3;

FIGS. 15A to 15C are waveform charts showing an operation of the circuit in FIG. 14;

FIGS. 17A to 17C are waveform charts showing detection of horizontal correlation.

DETAILED DESCRIPTION OF THE PREFERRED EMBODIMENT

Luminance and Chrominance Signal Separator

Figure 1:
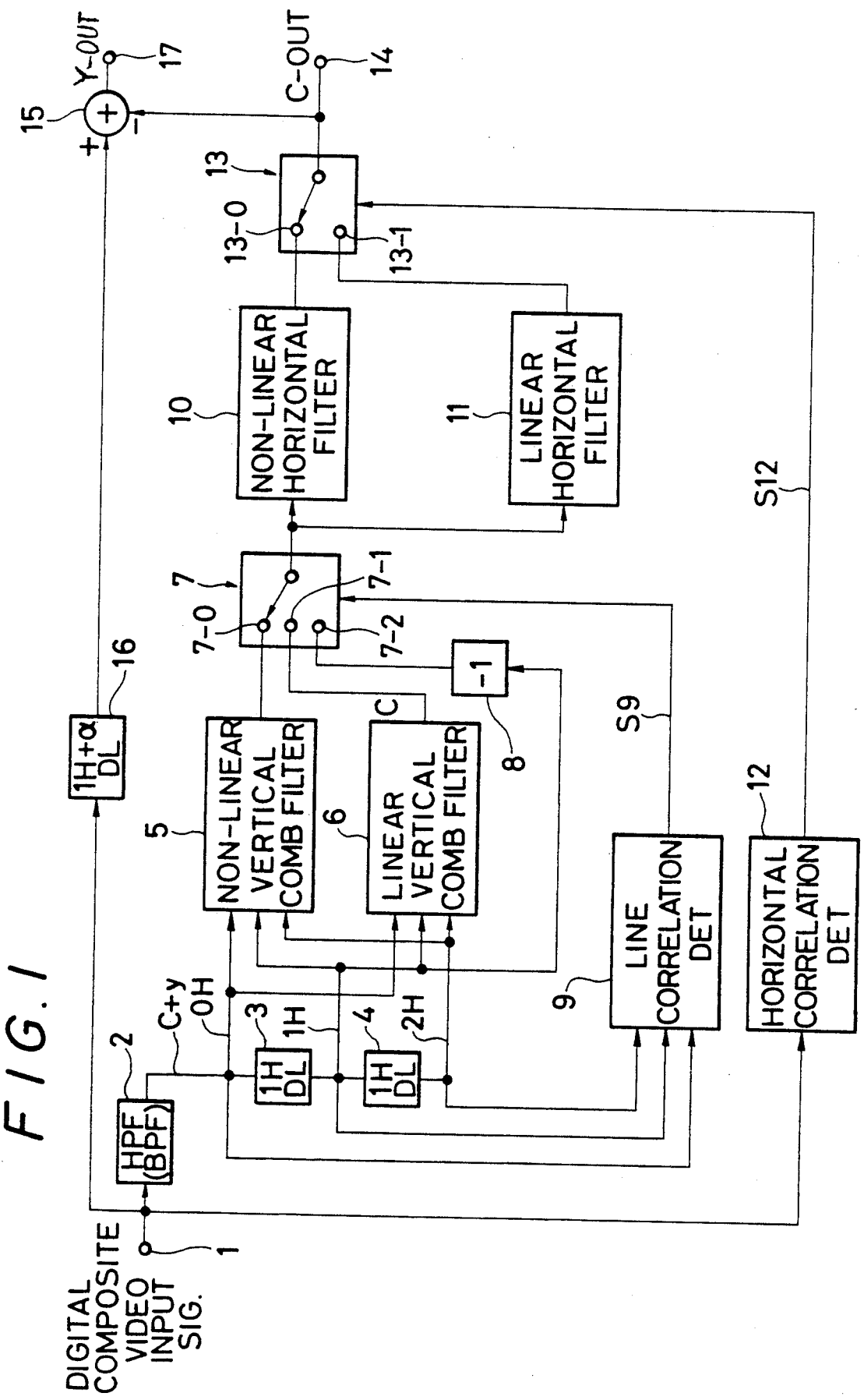
FIG. 1 is a block diagram of a digital luminance and chrominance signal separator to which the present invention is applied.

FIG. 1 is a block diagram showing a luminance and chrominance signal separator according to an embodiment of the present invention. A digital composite video input signal from an input terminal 1 is supplied to a high-pass filter (HPF) 2 or a band-pass filter (BPF) to extract chrominance components C. The extracted signal includes a high frequency luminance component y with a frequency higher than the subcarrier frequency of 3.58 MHz.

An output (C+y) from the high-pass filter 2 is supplied to a serial circuit consisting of two 1H (one horizontal line period) delay circuits 3 and 4. Video signals 0H, 1H and 2H corresponding to a successive three lines of signals are separately obtained from the input and outputs of the serial circuit. Each of these three line signals is divided into two signals, and supplied to non-linear and linear vertical comb filters 5 and 6, respectively.

These comb filters 5 and 6 extract chrominance components C on the basis of vertical correlation of the signals. In order to utilize advantages and eliminate disadvantages (to be described later) of the filters 5 and 6, they are selectively used in accordance with the conditions of the input video signal. More specifically, output signals from the filters 5 and 6, and a current line signal 1H obtained through a polarity matching inverter 8 are selected by a switch 7 in response to an output $S_9$ (2 bits) from a line (vertical) correlation detector 9 which detects the presence/absence of line correlation based on the three line signals 0H, 1H and 2H.

An output from the switch 7 is divided into two signals which are supplied to non-linear and linear horizontal filters 10 and 11, respectively. In the non-linear and linear vertical comb filters 5 and 6 in the former stage, the high frequency luminance component which causes color noise on a screen is not eliminated. This color noise is eliminated by the non-linear horizontal filter 10.

In the non-linear processing performed by the non-linear horizontal filter 10, degradation of signals occurs when horizontal correlation (continuity) exists. For this reason, a horizontal correlation detector 12 supplies a signal indicative the presence/absence of horizontal correlation of the input video signal which operates switch 13 so as to select an output from either linear or nonlinear horizontal filter 11 or 10, respectively.

A chrominance signal C obtained from the output of switch 13 is supplied to an output terminal 14 and a subtractor 15 wherein, the chrominance signal is subtracted from the input video signal which is received through a (1H+α) timing control delay circuit 16 thereby producing a luminance signal Y. Luminance signal Y is supplied to an output terminal 17.

Linear Vertical Comb Filter

In the linear vertical comb filter 6 a luminance component of a given line (current line) is approximated using an arithmetic mean of the upper and lower lines with respect to the current line. The luminance signal component is then eliminated by taking the difference between the approximated and current signals. In addition, the chrominance signals C, which have opposite phases every two adjacent lines, are extracted. The linear vertical comb filter 6 is a digital signal processing filter wherein the chrominance signal C, free from its high frequency luminance component, can be obtained by the following equation:

$$C = (\tfrac{1}{4})(1 - 2Z^{-H} + Z^{-2H}) \quad (1)$$

where $Z^{0H}$ (=1), $Z^{-H}$ and $Z^{-2H}$ are delayed signals corresponding to the signals 0H, 1H and 2H, respectively.

Figures 2A, 2B, 2C:
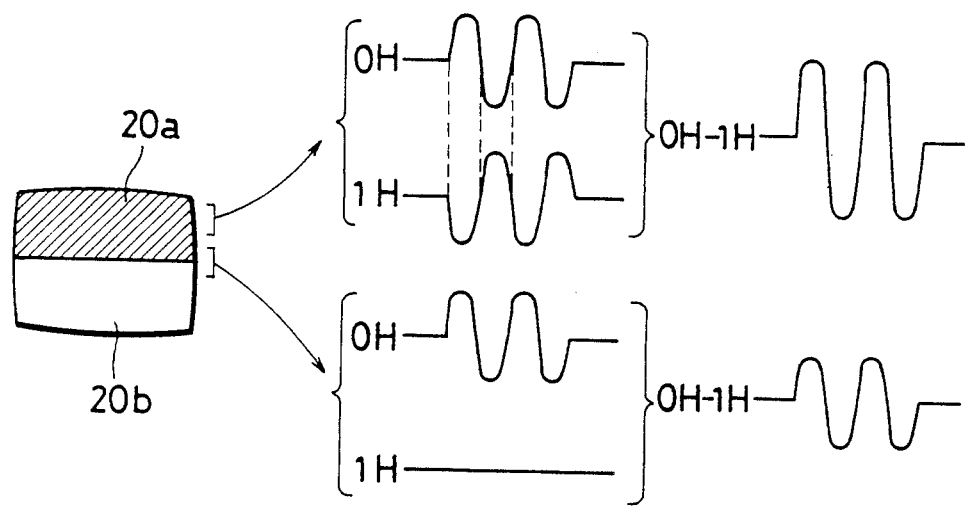
FIG. 2A shows an image sample and FIGS. 2B and 2C are waveform charts showing a separating operation of a linear vertical comb filter shown in FIG. 1.

When the chrominance signal is separated by the linear vertical comb filter 6 color smear is caused, that is an achromatic line of an input signal (FIG. 2B) is colored as shown in FIG. 2C, at an edge between the chromatic and achromatic portions 20a and 20b of the image shown in FIG. 2A.

Non-linear Vertical Comb Filter

Figure 3:
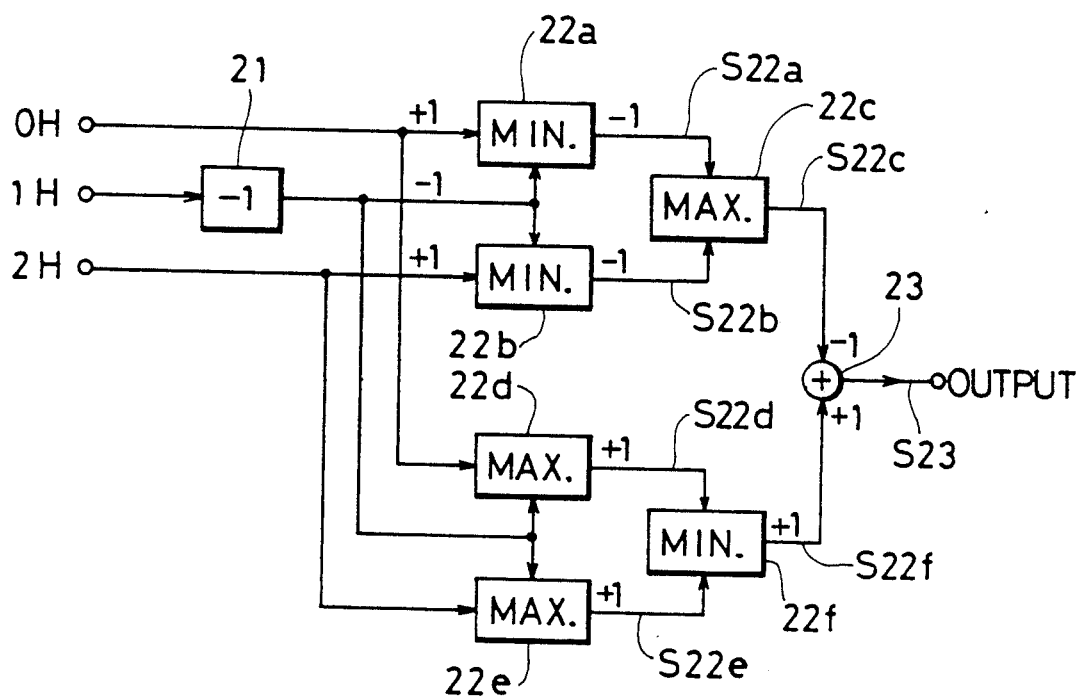
FIG. 3 is a block diagram showing an arrangement of a non-linear vertical comb filter in FIG. 1.

The non-linear comb filter 5 includes a vertical correlator as shown in FIG. 3, which operates as shown in FIGS. 4A to 7D. More specifically, the central line signal 1H, of the three input line signals 0H, 1H and 2H (FIG. 4A), is inverted by invertor 21 thereby forming signal $\overline{1H}$. As shown in FIG. 4B, the three chrominance line signals C are set in an in-phase state. The three line signals are processed by a logic circuit consisting of minimum value circuits 22a, 22b and 22f, and maximum value circuits 22c, 22d and 22e. As shown in FIG. 4C, a chrominance signal free from the luminance signal Y is extracted through an adder 23 (FIG. 3).

By using non-linear filter 5 with the vertical correlator at the edge between the chromatic and achromatic portions 20a and 20b of an image shown in FIG. 5A, the chrominance signal is separated without causing color smear of the achromatic line of the input signal (FIG. 2B).

Figures 6A, 6B, 6C:
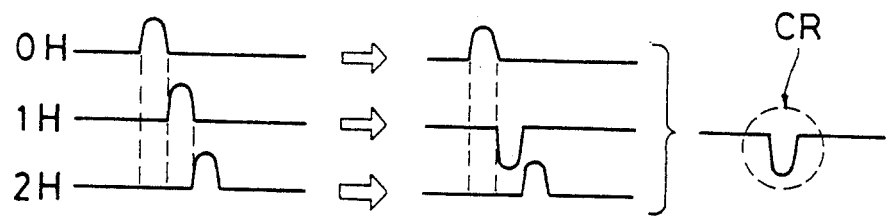
FIGS. 6A to 6C and FIGS. 7A to 7D are waveform charts for explaining an operation of the circuit in FIG. 3.

When a pattern (FIG. 6A) which obliquely crosses a screen is supplied, the three non-correlated line signals shown in FIG. 6B are processed wherein, a cross-color signal CR as shown in FIG. 6C is produced.

Figures 7A, 7B, 7C, 7D:
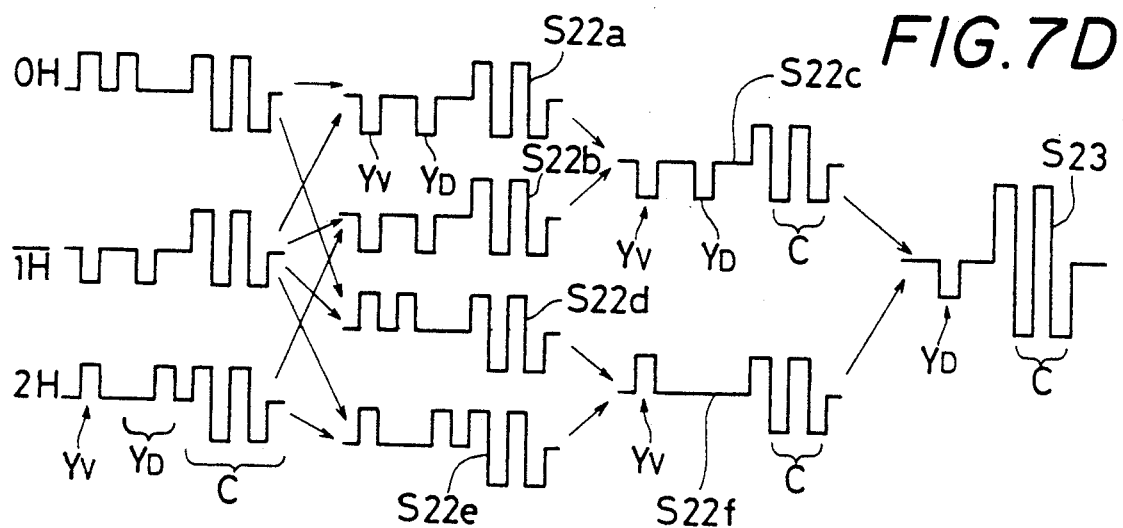

An operation of the non-linear comb filter 5 in FIG. 3 will be described below in detail with reference to FIGS. 7A to 7D. Three line signals having identical chrominance phases as shown in FIG. 7A are supplied to the minimum value circuits 22a and 22b. The output signals, $S_{22a}$ and $S_{22b}$, of circuits 22a and 22b as shown in FIG. 7B are supplied to the maximum value circuit 22c whereby an output signal $S_{22c}$ as shown in FIG. 7C is produced. Signal $S_{22c}$ includes the in-phase chrominance signals C and a negative-polarity luminance signal $Y_v$ which has vertical correlation.

Similarly, the three line signals are also supplied to the maximum value circuits 22d and 22e, and their respective outputs $S_{22d}$ and $S_{22e}$ as shown in FIG. 7B are supplied to the minimum value circuit 22f the output signal, $S_{22f}$, from circuit 22f includes the as shown in FIG. 7C, an output $S_{22f}$ including the in-phase chrominance signals and the positive-polarity correlative luminance signal $Y_v$.

Signals $S_{22c}$ and $S_{22f}$ are added in adder 23 thereby producing output signal $S_{23}$ in which a chrominance signal C is produced as shown in FIG. 7D, and the correlative luminance signal $Y_v$ is eliminated.

When a non-correlative luminance signal $Y_D$ exists, however, the signal $Y_D$ is mixed into the output signal $S_{23}$ through each logic circuit.

Interference due to foldover noise is caused in the digital signal processing performed in non-linear comb filter 5. In particular, this interference is noticeable when the image is changed smoothly.

However, the foldover noise is suppressed by utilizing an output from the linear comb filter 6 when correlation exists, that is, when the image is not abruptly changed in a vertical direction. The line correlation is detected by line correlation detector 9.

Line Correlation Detector

Figure 8:
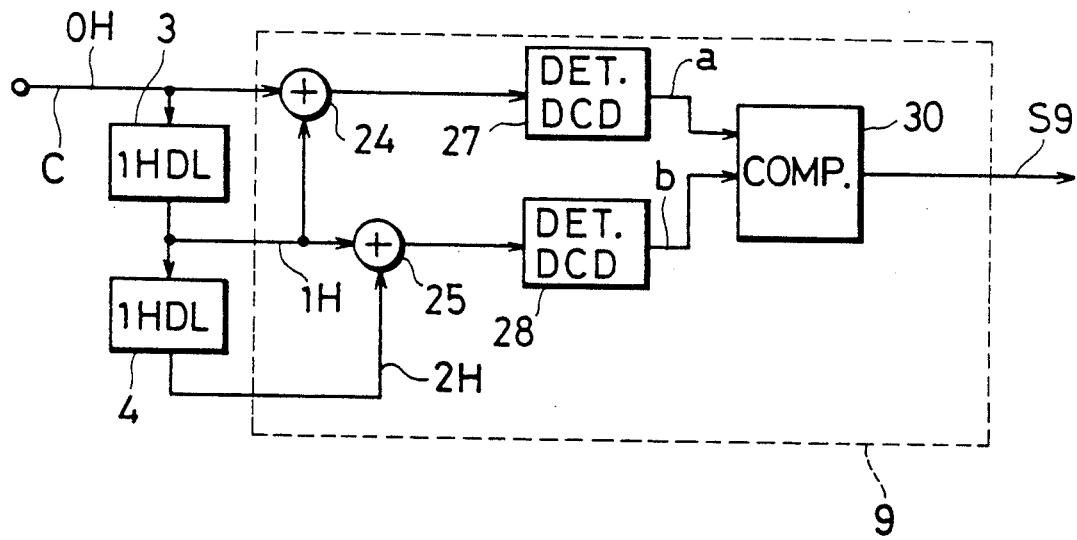
FIG. 8 is a block diagram of a line correlation detector shown in FIG. 1.

FIG. 8 is a block diagram showing a principle of the line correlator 9. The chrominance signal C, or line signal D extracted by the high-pass filter in FIG. 1 and the line signals 1H and 2H, delayed by the 1H delay circuits 3 and 4 are supplied to adders 24 and 25 as shown in FIG. 8.

Signals 0H and 1H are summed in adder 24. The sum is supplied to a detective decoder 27, wherein an output proportional to a carrier amplitude of a sum of (n−1) and n lines is obtained as follows:

$$a = |L_{n-1} + L_n| \quad (3)$$

Similarly, a signal representing a sum of n and (n+1) lines supplied from the adder 25 through a detective decoder 28 is obtained as follows:

$$b = |L_n + L_{n+1}| \quad (4)$$

Figure 9:
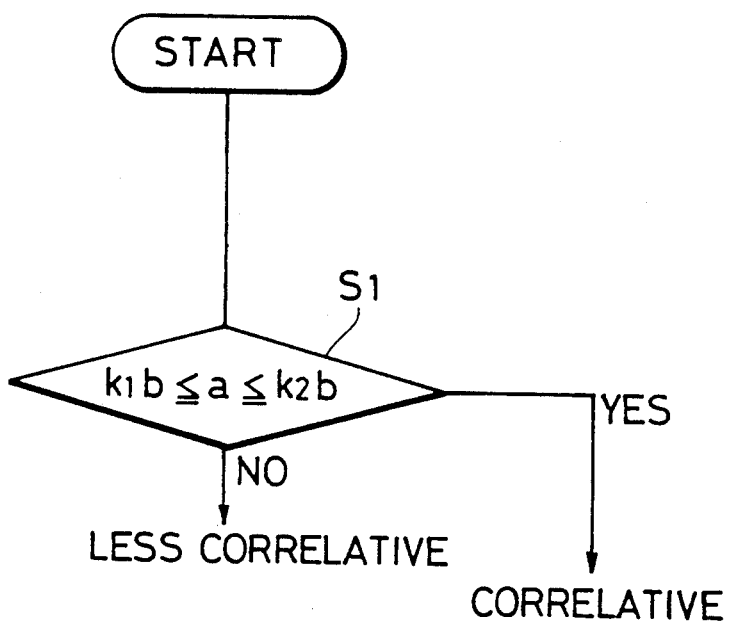
FIGS. 9 and 10A are flow charts showing an algorithm for determining line correlation.

The outputs a and b from the detective decoders 27 and 28 are supplied to a comparator 30. In the comparator 30, the processing shown in step S1 in FIG. 9 is performed. More specifically, predetermined coefficients $k_1$ (for example, 0.9) and $k_2$ (for example, 1.1) are multiplied with b, and a response to the relationship ($k_1 b \leq a \leq k_2 b$) is determined. If the response is NO (that is, $a \leq k_1 b$ or $a \geq k_2 b$) in step S1, the chrominance signal is abruptly changed, that is, "less correlative". If YES (that is, $k_1 b \leq a \leq k_2 b$) in step S1, it is determined to be "correlative".

The output from the comparator 30, $S_9$, provides the input signal to switch 7 for switching the two vertical comb filters 5 and 6 as shown in FIG. 1.

The line correlation detector 9 operates based on the concept described in FIGS. 8 and 9. However, the presence/absence of correlation is determined based on the algorithm shown in FIG. 10A. In FIG. 10B, reference symbol $L_n$ denotes a current line; $L_{n-1}$ and $L_{n-2}$, first and second preceding lines; and $L_{n+1}$ and $L_{n+2}$, first and second succeeding lines. In step S10 in FIG. 10A, a correlation value $VSOKAN_1$ between the lines $L_{n-1}$ and $L_{n+1}$ is detected by using the following correlation equation:

$$VSOKAN_1 = \frac{LPF_1 (ABS(L_{n+1} - L_{n-1}))}{LPF_2 (ABS(L_{n+1}))} \quad (5)$$

In equation 5, the numerator represents a difference between the line signals, and the denominator is a term used for standardizing a carrier level. Note that the symbol ABS denotes an absolute value. Low-pass filters $LPF_1$ and $LPF_2$ are included in the output stage of the correlation detector. Each low-pass filter is a non-recursive digital filter having the following response:

$$H_{LPF1}(Z) = (\tfrac{1}{4})(1 + 2Z^{-1} + Z^{-2}) \quad (6)$$
$$H_{LPF2}(Z) = (\tfrac{1}{4})(1 + 2Z^{-1} + Z^{-2}) \cdot (\tfrac{1}{4})(1 + 2Z^{-2} + Z^{-4}) \quad (7)$$

where $Z^{-1}$, $Z^{-2}$, $Z^{-4}$ are delays for each sampling interval of quantization.

In step S10, correlation is determined by comparing the correlation value $VSOKAN_1$ with a reference level. If the correlation value $VSOKAN_1$ is larger than the reference level, it is determined to be "less correlative". If the value $VSOKAN_1$ is smaller than the reference level, it is determined to be "correlative".

If, it is found to be "less correlative" in step S10 then, continuity of the successive lines $L_{n-1}$, $L_n$ and $L_{n+1}$ is determined in step S12 by using the following discriminant:

$$VCONT = \frac{LPF_2 (ABS(L_{n-1} + L_n))}{LPF_2 (ABS(L_n + L_{n+1}))}. \quad (8)$$

More specifically, the continuity VCONT is calculated as a ratio of the sum of lines $L_{n-1}$ and $L_n$, to a sum of lines $L_n$ and $L_{n+1}$. If the value VCONT is near "1", it is determined to be "continuative" whereas; if value VCONT is sufficiently smaller or larger than "1", it is determined to be "non-continuative". Note that the processing in step S12 corresponds to the operations performed in the adders 24 and 25, the detective decoders 27 and 28, and the comparator 30 shown in FIG. 8.

Step S12 results in "non-continuative" when the current line does not correlate with the first preceding line. Whe this occurs a contact 7-0 in switch 7 in FIG. 1 is selected, in response to the output $S_9$ from the line correlation detector 9, whereby an output from the non-linear vertical comb filter 5 is selected. Therefore, when the chrominance signal is abruptly changed, color smear is avoided by utilizing the non-linear filter processing. If the response in step S12 is found to be "continuative", then the current line is "correlative", and a contact 7-1 in switch 7 in FIG. 1 is selected thereby selecting the output from the linear vertical comb filter 6. Therefore, when line correlation exists linear filter processing, which is free from interference due to foldover, can be performed.

If the response is found to be "correlative" in step S10, color omission of the current line $L_n$ is detected in the succeeding step S11. More specifically, a subcarrier level is obtained as follows:

$$CALEV = LPF_2(ABS(L_n)) \quad (9)$$

If the level CALEV is higher than a predetermined level, continuity among the three lines is determined in step S12, as described above.

If the subcarrier level of the line $L_n$ in step 11 is smaller than the predetermined value, color omission may be caused in a single line. When this occurs the correlation between lines $L_{n-2}$ and $L_n$ is determined by the succeeding step S13. A value obtained by delaying the correlation value $VSOKAN_1$ in step S10 by one horizontal period is used as the correlation value $VSOKAN_0$. If there is little or no correlation between lines $L_{n-2}$ and $L_n$, a contact 7-2 in switch 7 in FIG. 1 is selected thereby selecting a current signal the switch 7 is selected to select a current signal which has sequentially passed through the high-pass filter 2, the delay circuit 3 and the inverter 8. Therefore, when color omission in a single line, occurs, a display operation can be performed without the degradation due to the interference caused by the comb filters 5 and 6.

If the lines are determined to be "correlative" in step S13, color omission by a signal tangent to a color bar edge in, for example, a color bar test pattern may often be determined wherein, the continuity of the three lines is determined in Step 12. If the lines are determined to be "non-continuative"; in step S12, an output from the non-linear comb filter 5 is selected because of an edge of a color bar thereby, eliminating color smear.

Figure 10A:
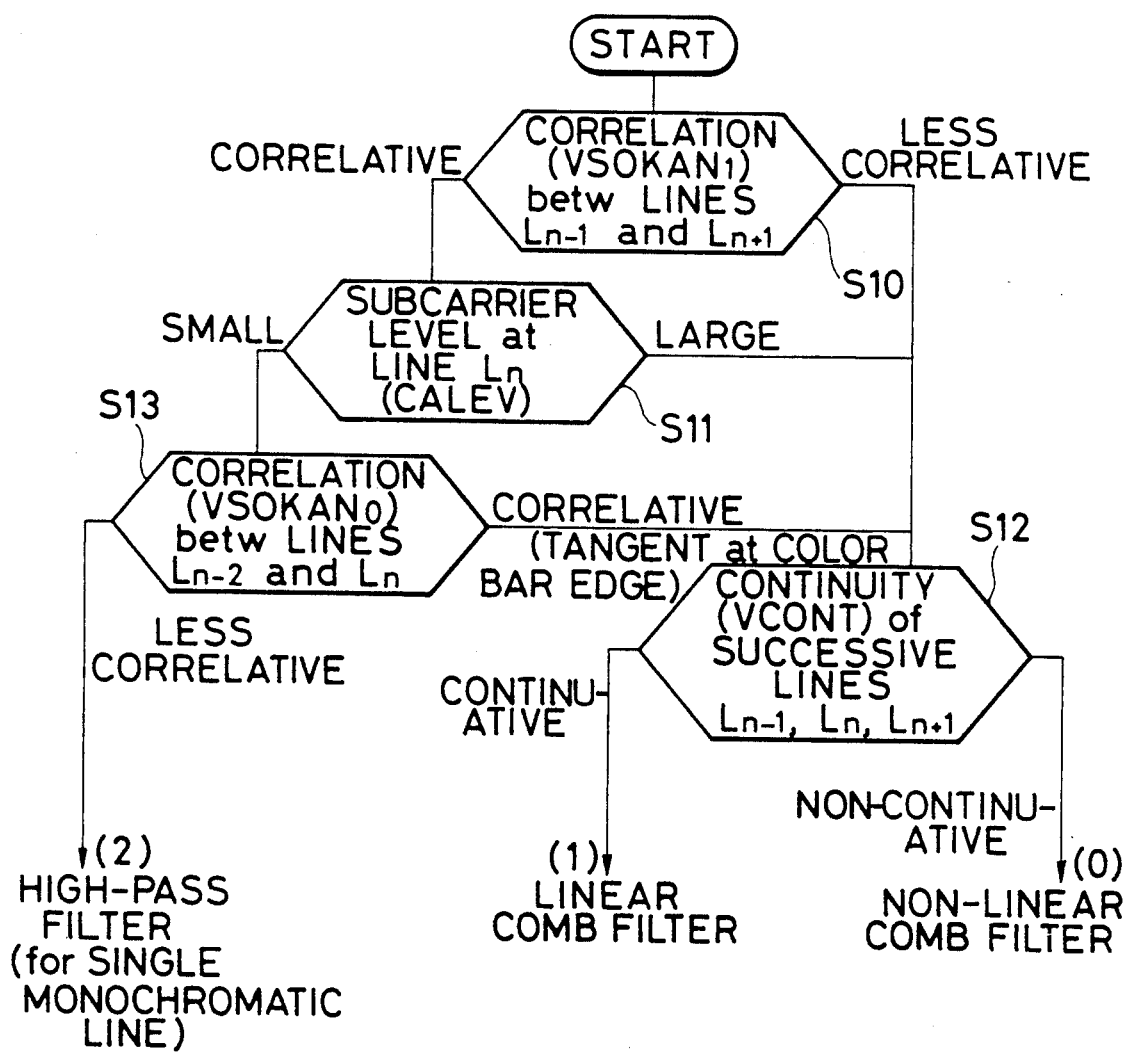
Figure 10B:
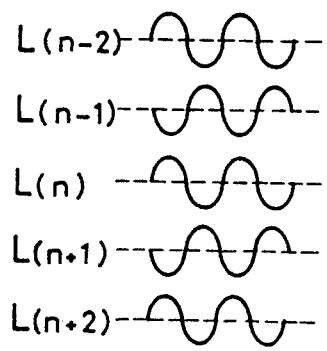
FIG. 10B is a waveform chart of a subcarrier on a horizontal line.

The above-mentioned determination of line correlation shown in FIG. 10A is performed every sampling period with respect to the input digital video signal, and the switch 7 is switched to select one of the contacts at corresponding sampling intervals from a sampling clock. The vertical comb filters 5 and 6 also perform processing within every sampling period.

Non-linear Horizontal Filter

Figure 11:
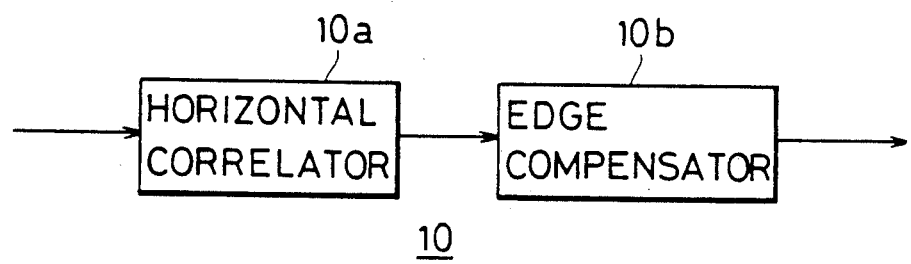
FIG. 11 is a block diagram of a non-linear horizontal filter shown in FIG. 1.

As described above, the non-linear horizontal filter 10 eliminates an interference component leaking from the non-linear or linear vertical comb filter 5 or 6 and appearing as oblique fringes (cross-color pattern). FIG. 11 is a block diagram showing an arrangement of the non-linear horizontal filter 10 which includes a horizontal correlator 10a and an edge compensator 10b.

Figure 12:
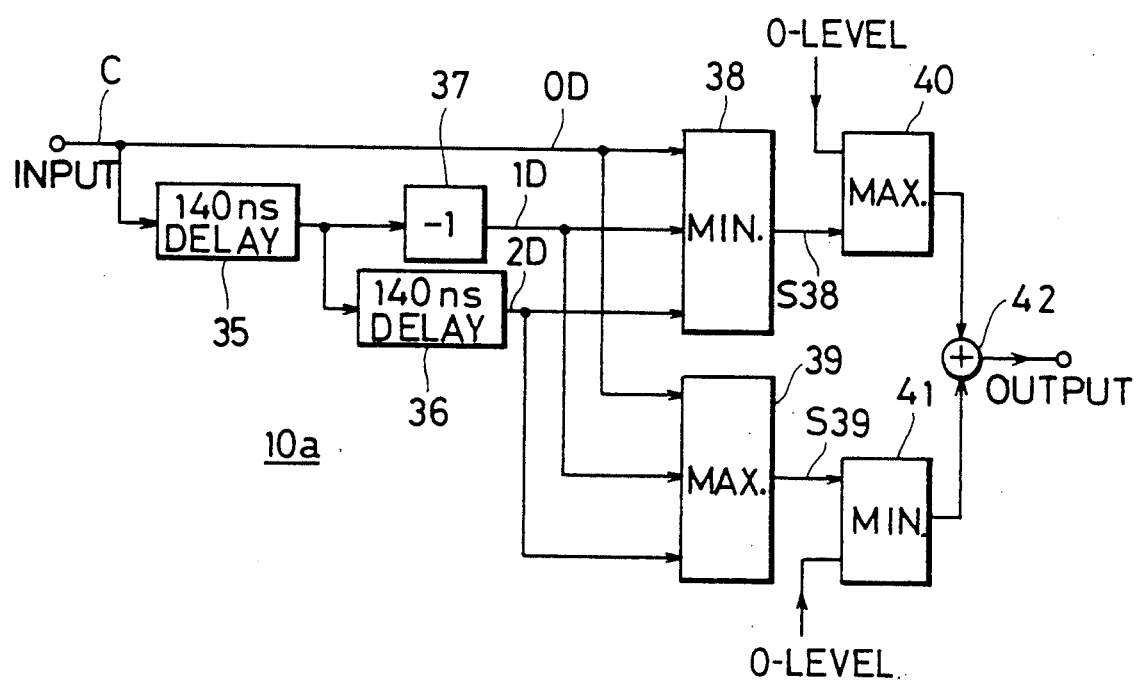
FIG. 12 is a block diagram of a horizontal correlator in FIG. 11.
Figures 13A, 13B, 13C:
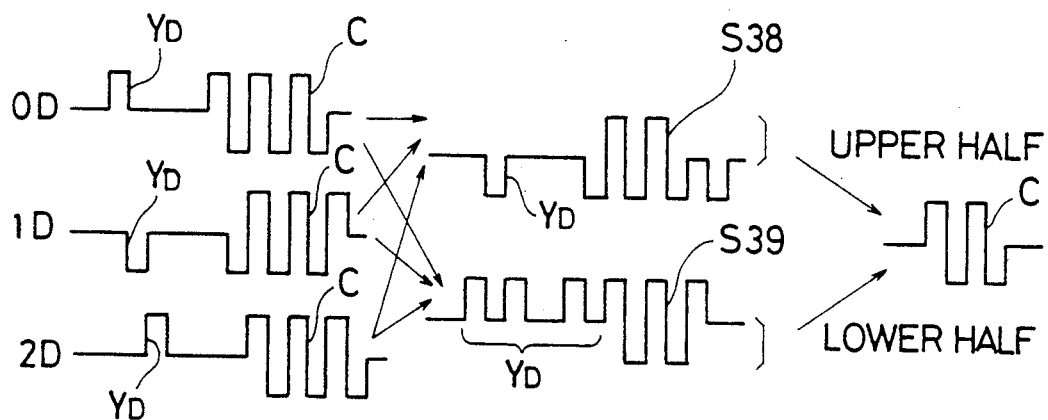
FIGS. 13A to 13C are waveform charts showing an operation of the circuit in FIG. 12.

FIG. 12 is a block diagram showing a known arrangement of the horizontal correlator 10a, and FIGS. 13A to 13C are waveform charts for explaining an operation of the horizontal correlator 10a. As shown in FIG. 13A, in-phase signals 0D, 1D and 2D are formed by shifting each subcarriers signal with respect to the input chrominance signal C by a half period through the use of 140 ns delay circuits 35 and 36, and where signal 1D is inverted by inverter 37. These in phase signals are supplied to minimum and maximum value circuits 38 and thereby forming outputs $S_{38}$ and $S_{39}$, respectively. Output signals, $S_{38}$ and $S_{39}$, include the upper and lower half waves of the chrominance signal as normal signals, as shown in FIG. 13B. Negative-polarity and positive-polarity high frequency luminance components $Y_D$ having different phases are combined in outputs $S_{38}$ and $S_{39}$.

Outputs from the minimum and maximum value circuits 38 and 39 are supplied to maximum and minimum value circuits 40 wherein 41, respectively, and the outputs are compared with "0" level (pedestal). The upper and lower half waves are extracted from circuits 40 and 41, respectively. The high frequency luminance components $Y_D$ are thereby eliminated from the extracted half waves, which are combined by an adder 42 to form a separated chrominance signal as shown in FIG. 13C.

Figure 14:
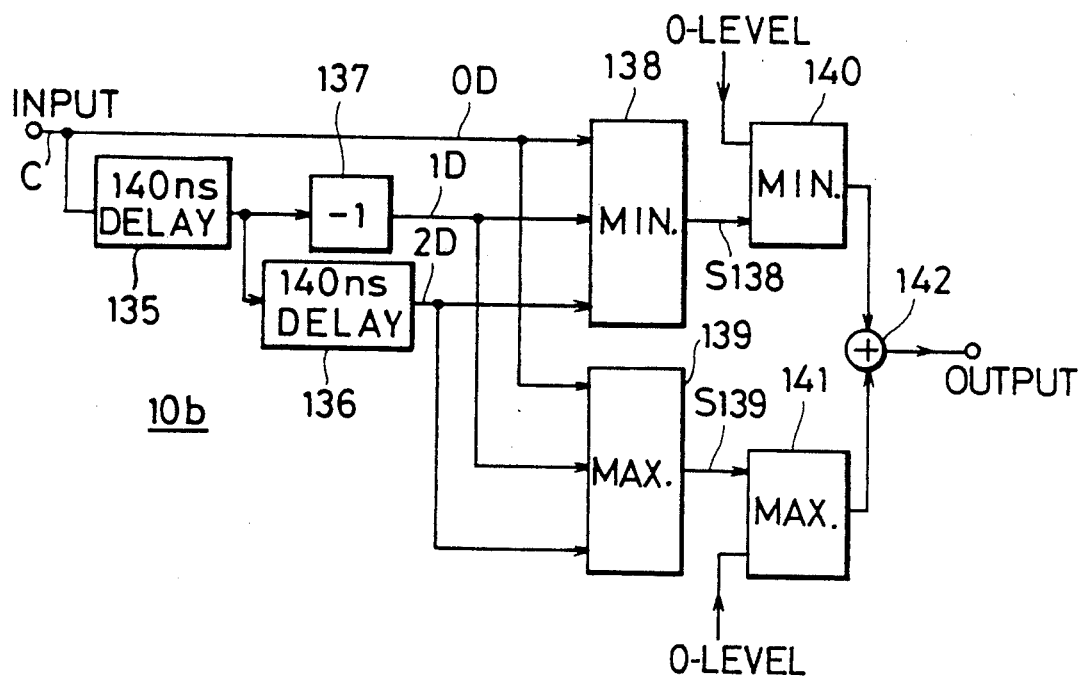
FIG. 14 is a block diagram of an edge compensator shown in FIG. 11.

Thus, a cross-color interference component leaking from the vertical comb filters 5 and 6 in the former stage is eliminated. However, as shown in FIG. 13C, one wave edge of the chrominance signal is damaged. This damaged edge is compensated by the succeeding edge compensator 10b. As shown in FIG. 14, the edge compensator 10b can be realized by replacing the maximum value circuit 40 with the minimum value circuit 41 in the horizontal correlator 10a in FIG. 12. More specifically, the output signal C from the horizontal correlator 10a shown in FIG. 13C is supplied to the input terminal of the edge compensator 10b shown in FIG. 14. As shown in FIG. 14, the signal C is supplied to minimum and maximum value circuits 138 and 139, respectively and a delay circuit 135 for delaying the subcarrier a half period. The output from the delay circuit 135 is supplied to an invertor 137 and a second delay circuit 136, which is identical to delay circuit 135. Outputs from the inverter 137 and the delay circuit 136 are fed to the minimum and maximum value circuits 138 and 139, respectively, whereby output signals S138 and S139 as shown in FIG. 15B are obtained. Output signals S138 and S139 are supplied to minimum and maximum value circuits 140 and 141 and compared to "0" level. Therefore, minimum value circuit 140 outputs a signal component whose level is "0" or less and maximum value circuit 141 outputs a signal component whose level is "0" or more. These outputs are added to each other by an adder 142 producing a signal C as in FIG. 15C. The signal C is processed so that the high frequency luminance signal components $Y_D$ are eliminated from the signal shown in FIG. 13A and without damaged wave edges.

The above-mentioned cross-color elimination performed by the horizontal correlator 10a is non-linear processing. As described above, both the non-linear and linear horizontal filters 10 and 11 are used selectively so as to complement each other wherein, the filter selection is determined by the output of horizontal correlation detector 12 in FIG. 1.

Horizontal Correlation Detector

The horizontal correlation detector 12 in FIG. 1 employs an arrangement similar to that in FIG. 8, and includes a delay circuit group for each sampling period, a detective decoder, and a level comparator. The processing algorithm used in the horizontal correlation detector 12 is shown in FIGS. 16A and 16B.

Figure 16A:
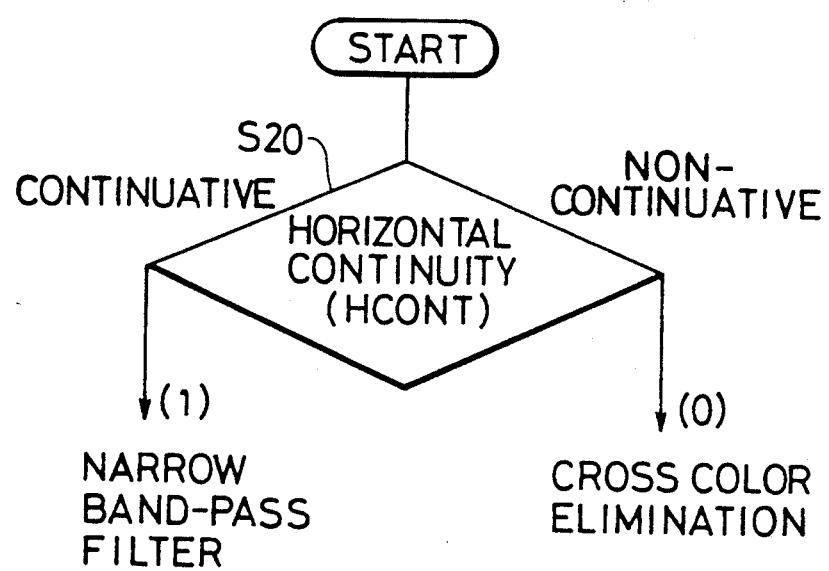
FIG. 16A is a flow chart showing an algorithm for detecting correlation used in the horizontal correlation; detector shown in FIG. 1.
Figure 16B:
FIG. 16B is a view showing sampling points on the horizontal line.

In order to determine the horizontal chrominance continuity in step S20 of FIG. 16A, chrominance sampling values, . . . , $P_{J-3}$, $P_{J-2}$, $P_{J-1}$, $P_J$, $P_{J+1}$, $P_{J+2}$, $P_{J+3}$, . . . , of the preceding and succeeding successive sampling points of a determination point $P_J$ in FIG. 16B are referred to. Shifts along the horizontal direction are at the sampling clock period.

In principle, a change in ratio of the preceding and succeeding points to the point $P_J$ may be checked in the same manner as in the processing (equation (8)) in of step S12 in FIG. 10. However, as shown in FIGS. 17A to 17C, both a luminance and chrominance edge must be detected for a horizontal non-continuative point. The luminance edge is detected to eliminate the cross-color, and the chrominance edge is detected to decrease a dot interference at the chrominance edge. Therefore, both the luminance and chrominance edges are detected with respect to the input chrominance signal shown in FIG. 17A, in accordance with a difference between the four points spaced apart from each other, as shown in FIG. 17B. The sampling frequency, with respect to the video signal is four times the subcarrier frequency ($4f_{sc}$).

The equation of continuity used in steps S20 in FIG. 16A is:

$$HCONT = \frac{LPF_2 (ABS(P_{J+1} - P_{J+5}))}{LPF_2 (ABS(P_{J-5} - P_{J-1}))} \tag{10}$$

More specifically, a ratio of a difference between the first succeeding point and the fifth succeeding point to the fifth preceding point and the first preceding point of the target point $P_J$ is calculated to determine continuity.

The response of the low-pass filter $LPF_2$ is identical to that in equation (7) for the vertical system. The low-pass filter $LPF_2$ is a non-recursive digital filter having the following response:

$$H_{LPF2}(Z) = (\tfrac{1}{4})(1 + 2Z^{-1} + Z^{-2}) \cdot (\tfrac{1}{4})(1 + 2Z^{-2} + Z^{-4}) \quad (11)$$

Responses of the numerator and the denominator in the equation (10) are delayed by the low-pass filter $LPF_2$ as shown in FIG. 17C. In the equation (10), in consideration of the delay, the edge is detected on the basis of points shifted by one-dot to exclude the target point $P_J$.

The response is determined to be "continuative" in step S20 if the value HCONT in the equation (10) is near to "1", and "non-continuative" if the value HCONT is sufficiently smaller or larger than "1". If "non-continuative" in step S20, the switch 13 in FIG. 1 connected to a contact 13-0 in response to output $S_{12}$ from the horizontal correlation detector 12, thereby selecting an output from the non-linear horizontal filter 10.

If "continuative" in step S20, the switch 13 is connected to a contact 13-1 in response to the output $S_{12}$ so as to select the linear horizontal filter 11. The linear horizontal filter 11 includes a narrow band-pass filter.

If the cross-color correction can be disregarded, i.e., cost performance is a problem, the linear and non-linear horizontal filters can be omitted. When the PAL video signal is used, a 2H delay circuit must be used in place of the 1H delay circuit, and the arrangement is very complicated. Therefore, the linear and non-linear vertical comb filters may be omitted in that case to avoid such complication and the resultant increased cost.

According to one aspect of the present invention, the non-linear and linear vertical comb filters are selectively used to complement to each other in accordance with the presence/absence of vertical correlation. Therefore, foldover noise of harmonic distortion caused by non-linear digital processing is not noticeable even when an image is gradually changed. In addition, color smear caused by linear comb filter processing does not occur when the image is abruptly changed. A large-scale digital circuit operating at very high speed has been conventionally required because the processing rate of the non-linear vertical comb filter must be large due to the over-sampling processing so as to decrease the foldover noise (aliasing noise). However, the present invention provides a high-performance luminance and chrominance signal separator having a more practical size and speed.

According to another aspect of the present invention, a cross-color component leaking through the vertical comb filter processing is eliminated by a non-linear horizontal filter. In addition, non-linear and linear horizontal filters are selectively used to complement each other so that distortion caused by the non-linear processing is not noticeable when the image is gradually changed in the horizontal direction. Therefore, this high-precision operation can be performed in the horizontal direction without signal degradation.

What is claimed is:

1. An apparatus for separating a luminance signal and a chrominance signal from a digital composite video signal comprising:

first filter means for extracting from the composite video signal the chrominance signal and a high frequency component of the luminance signal included within the frequency band of said chrominance signal;

non-linear vertical comb filter means;

means for supplying three successive horizontal line signals of the chrominance signal and high frequency component of the luminance signal to said non-linear vertical comb filter means to generate a chrominance signal without color smear;

linear vertical comb filter means receiving said three successive horizontal line signals of the chrominance signal for generating a chrominance signal without aliasing noise;

correlation detection circuit means for detecting correlation between said three successive horizontal line signals; and means responsive to said detecting for selecting an output of said non-linear vertical comb filter when there is an absence of correlation, and selecting an output of said linear vertical comb filter when correlation exists.

2. The apparatus according to claim 1, further comprising subtractor means for subtracting the chrominance signal output from one of said linear and non-linear vertical comb filter means from the digital composite video signal so as to obtain the luminance signal.

3. The apparatus according to claim 2, in which said first filter means is a high-pass filter.

4. The apparatus according to claim 2, in which said first filter means is a band-pass filter.

5. An apparatus for separating a luminance signal and a chrominance signal from a digital composite video signal comprising:

first filter means for extracting from the composite video signal the chrominance signal and a high frequency component of the luminance signal included within the frequency band of said chrominance signal;

non-linear horizontal filter means receiving an output signal of said first filter means for generating the chrominance signal without a cross-color component;

linear horizontal filter means receiving said output signal of said first filter means for generating the chrominance signal without aliasing noise;

horizontal correlation detection circuit means for detecting horizontal correlation between successive picture elements on one horizontal line of said digital composite video signal;

switch means responsive to an output signal from said horizontal correlation detection circuit for selecting one output signal of said non-linear and linear horizontal filters; and subtractor means for subtracting an output signal of said switch means from said digital composite video signal so as to obtain the luminance signal.

6. The apparatus according to claim 5, in which said switch means selects the output signal of said non-linear horizontal filter when there is an absence of horizontal correlation between the successive picture elements, and said switch means selects the output signal of said linear horizontal filter when horizontal correlation exists.

7. An apparatus for separating a chrominance signal and luminance signal from a composite video signal comprising:

extracting means for extracting from the composite video signal the chrominance signal and a high frequency component of the luminance signal included within the frequency band of said chrominance signal;

means connected to said extracting means for producing successive horizontal line signals;

non-linear vertical comb filter means receiving said successive horizontal line signals for producing a chrominance signal without color smear;

linear vertical comb filter means receiving said successive horizontal line signals for producing a chrominance signal without aliasing noise;

first correlation detection means connected to said extracting means for detecting correlation between the successive horizontal line signals;

first selecting means responsive to an output signal of said first correlation detection means for selecting one of the output signals of said non-linear and linear vertical comb filter means;

non-linear horizontal filter means receiving an output from said first selecting means for producing chrominance signals without a cross-color component;

linear horizontal filter means receiving said output from said first selecting means for producing chrominance signals without aliasing noise;

second correlation detection means for detecting horizontal correlation between successive picture elements on one horizontal line signal of said composite video signal;

second selecting mean responsive to an output signal of said second correlation detection means for selecting one of the output signals of said non-linear and linear horizontal filter means; and subtracting means for subtracting an output signal of said second selecting means from said digital composite signal so as to obtain the luminance signal.

8. The apparatus according to claim 7, in which said extracting means includes a high-pass filter.

9. The apparatus according to claim 7, in which said extracting means includes a band-pass filter.

10. The apparatus according to claim 7, in which said means for producing successive horizontal line signals includes two delay circuits, wherein each of said delay circuits has a delay time of one horizontal line period so as to produce non-delayed, one horizontal period delayed and two horizontal periods delayed signals.

11. The apparatus according to claim 8, in which said first selecting means selects the output signal of said non-linear vertical comb filter means when there is an absence of vertical correlation between said successive horizontal line signals, and selects the output signal of said linear vertical comb filter means when correlation exists.

12. The apparatus according to claim 11, in which said second selecting means selects the output signal of said non-linear horizontal filter means when there is an absence of horizontal correlation, and selects the output signal of said linear horizontal filter means when horizontal correlation exists.

13. The apparatus according to claim 12, further comprising inverting means connected between said producing means and said first selecting means, said first selecting means selects an output signal of said inverting means when there is an absence of vertical correlation between the non-delayed and two horizontal period delayed signals.

* * * * *